United States Patent [19]

Dshkhunian et al.

[11] Patent Number: 4,471,455

[45] Date of Patent: Sep. 11, 1984

[54] CARRY-FORMING UNIT

[76] Inventors: Valery L. Dshkhunian, K-482, korpus 338"A", kv. 78; Sergei S. Kovalenko, K-98, korpus 421, kv. 3; Pavel R. Mashevich, K-482, korpus 338"A", kv. 139; Vladislav R. Naumenkov, Beskudnikovsky bulvar, 30, kv. 32, all of Moscow, U.S.S.R.

[21] Appl. No.: 345,696

[22] Filed: Feb. 4, 1982

[51] Int. Cl.$^3$ .............................................. G06F 7/50
[52] U.S. Cl. .................................................. 364/786
[58] Field of Search ............... 364/768, 784, 786, 736, 364/769, 778, 787

[56] References Cited

U.S. PATENT DOCUMENTS

| | | | |
|---|---|---|---|
| 3,249,747 | 5/1966 | Booher | 364/786 |
| 3,728,532 | 4/1973 | Pryor | 235/175 |
| 3,878,986 | 4/1975 | Hirasawa | 364/784 |
| 3,932,734 | 1/1976 | Parsons | 364/786 |
| 4,016,546 | 4/1977 | Bennett et al. | 340/172.5 |
| 4,071,905 | 1/1978 | Oguchi et al. | 364/786 |
| 4,152,775 | 5/1979 | Schwartz | 364/786 |
| 4,179,746 | 12/1979 | Tubbs | 364/768 |
| 4,228,520 | 10/1980 | Letteney et al. | 364/786 |
| 4,323,982 | 4/1982 | Eichrodt et al. | 364/786 |
| 4,369,500 | 1/1983 | Fette | 364/786 |

OTHER PUBLICATIONS

Weller, C. W., "A High-Speed Carry Circuit for Binary Adders", *IEEE Transactions on Computers*, vol. C-18, No. 8, Aug. 1969, pp. 728-732.

*Primary Examiner*—Jerry Smith
*Assistant Examiner*—Gary V. Harkcom
*Attorney, Agent, or Firm*—Holman & Stern

[57] ABSTRACT

The carry-forming unit comprises a first MOSFET, a second MOSFET, a third MOSFET, a first inverter, a second inverter, an OR-NOT circuit. The input of the first inverter is connected to the input of the first preparatory function. The output of the first inverter and the drain of the first MOSFET are connected to a carry output. The gate of the first MOSFET and the input of the second inverter are connected to the input of second preparatory function. The sources of the first and second MOSFET's and a first input of the NOR-circuit are connected to the carry input of the carry-forming unit. The drain of the second MOSFET is connected to a power supply line while the pulse input of the first inverter and the gate of the second MOSFET are connected to a clock signal line. The source of the third MOSFET is connected to a common bus and its drain—to the source of the first MOSFET. A second input of the OR-NOT circuit is connected to the output of the second inverter and the output—to the gate of the third MOSFET. The present invention helps increase the speed of multi-bit adders, priority and comparator circuits, which results in an increased capacity of computer systems.

1 Claim, 2 Drawing Figures

CARRY-FORMING UNIT

FIELD OF THE INVENTION

The present invention relates to the field of digital computers and, in particular, to carry-forming units.

The carry-forming unit of the invention can be used in multi-bit arithmetic units, priority and comparator circuits employing MOSFET's (metal-oxide-semiconductor field effect transistor) incorporated in large-scale integrated (LSI) circuits of microprocessors and microcomputers.

BACKGROUND OF THE INVENTION

There is known in the art a carry-forming unit (cf., U.S. Pat. No. 3,728,532 of April 1973, class G 06 F 7/06) comprising two gate circuits and an inverter and having two inputs, a control input and an output. A first one of said two inputs is connected to the carry input and a second one—to the operand bit input, and the control input is connected to the output of an exclusive OR-circuit of the adding circuit. The output of the carry-forming unit is connected to the carry output.

Said prior art unit features a low speed and is hard to implement inasmuch as it employs transistors of complementary types (C-MOSFET).

Closest to the herein disclosed carry-forming unit by its technical solution is a prior art carry-forming unit (cf., U.S. Pat. No. 4,016,546 of 1977, class 340/172.5) comprising a first MOSFET transmitting a signal from a carry input to a carry output of the carry-forming unit, a second MOSFET for resetting the carry-forming unit and a first inverter for shaping at the carry output a signal of carry from a given bit, the input of said inverter being connected to the input of first preparatory function of the carry-forming unit while the output of the first inverter and the drain of the first MOSFET are connected to the carry output of the carry-forming unit, and the gate of the first MOSFET is connected to the input of second preparatory function of the carry-forming unit. The sources of the first and second MOSFET's are connected to the carry input of the carry-forming unit, the drain of the second MOSFET is connected to a power supply line, and the gate of the second MOSFET and pulse input of the first inverter are connected to a clock signal line.

Under conditions of a high bit capacity of numbers being processed, such a carry-forming unit is incapable of ensuring a high speed inasmuch as, in the worst case of a complete carry, the signal passes through series-connected MOSFET's presenting a distributed R-C circuit the delay in which increases with the bit capacity.

SUMMARY OF THE INVENTION

It is the object of the present invention to develop a carry-forming unit making for an increased speed of multibit adders, priority and comparator circuits.

The object set is attained in a carry-forming unit comprising a first MOSFET transmitting a signal from a carry input to a carry output of the carry-forming unit and a second MOSFET for resetting the carry-forming unit and a first inverter for shaping at the carry output a signal of carry from a given bit. The input of the first inverter is connected to the input of the first preparatory function of the carry-forming unit while the output of the first inverter and the drain of the first MOSFET are connected to the carry output of the carry-forming unit. The gate of the first MOSFET is connected to the input of the second preparatory function of the carry-forming unit, the sources of the first and second MOSFET's are connected to the carry input of the carry-forming unit, the drain of the second MOSFET is connected to a power supply line, and the pulse input of the first inverter and gate of the second MOSFET are connected to a clock signal line. According to the present invention, provision is made for a third MOSFET whose source is connected to a common bus while its drain is connected to the drain of the first MOSFET. An OR-NOT circuit and a second inverter form with the third MOSFET a circuit for the carry signal transmission from the carry input to the carry output of the carry-forming unit. A first input of the OR-NOT circuit is connected to the carry input while its second input is connected to the output of the second inverter whose input is connected to the input of the second preparatory function. The output of the OR-NOT circuit is connected to the gate of the third MOSFET.

The herein disclosed solution helps reduce the add time of two 16-bit numbers to 100 ns which is 5-6 times less than in the case of prior art solution, given analogous MOSFET parameters. A similar gain can be attained by using the carry-forming unit in comparator and priority circuits. Under conditions of a higher bit capacity of devices, the gain in speed increases, which results in a higher capacity of computer systems.

BRIEF DESCRIPTION OF DRAWINGS

The present invention will be better understood upon considering the following description of a specific embodiment thereof, with due reference to the accompanying drawings in which.

DETAILED DESCRIPTION OF THE INVENTION

Figure 1:
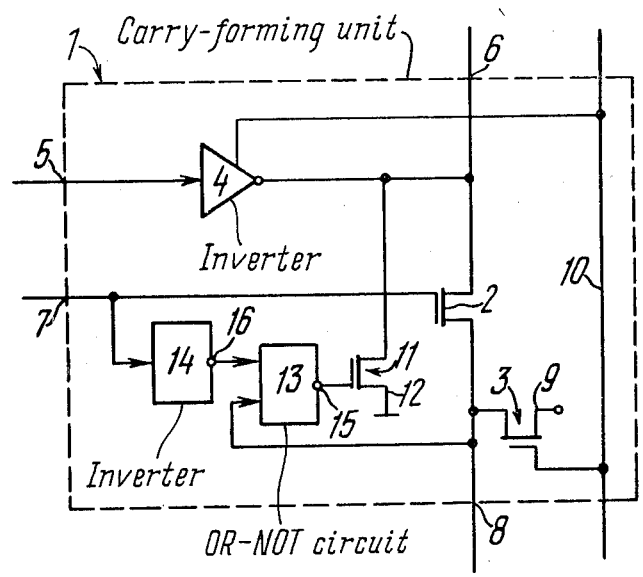
FIG. 1 is a schematic view of the carry-forming unit according to the present invention.

Referring now to FIG. 1 of the accompanying drawings, a carry-forming unit 1 comprises a MOSFET 2, a MOSFET 3 and an inverter 4 whose input is connected to an input 5 of a first preparatory function of the carry-forming unit 1. The output of the inverter 4 is connected to a carry output 6 of the carry-forming unit 1. The drain of the MOSFET 2 is connected to the carry output 6 of the carry-forming unit 1. The gate of the MOSFET 2 is connected to an input 7 of a second preparatory function of the carry-forming unit 1. The sources of the MOSFET's 2 and 3 are connected to a carry input 8 of the carry-forming unit 1, a drain 9 of the MOSFET 3 is connected to a power supply line while the gate of the MOSFET 3 and pulse input of the inverter 4 are connected to a clock signal line 10.

The carry-forming unit 1 further comprises a MOSFET 11 whose source 12 is connected to a common bus while its drain is connected to the carry output of the carry-forming unit 1. The carry-forming unit 1 also comprises an OR-NOT circuit 13 and an inverter 14. An output 15 of the OR-NOT circuit 13 is connected to the gate of the MOSFET 11. A first input of the OR-NOT circuit 13 is connected to the carry input 8 of the carry-forming unit 1. A second input of the OR-NOT circuit 13 is connected to an output 16 of the inverter 14 whose input is connected to the input 7 of second preparatory function of the carry-forming unit 1.

The MOSFET 2 transmits a signal from the carry input 8 to the carry output 6 of the carry-forming unit 1. The MOSFET 3 serves for resetting the carry-forming unit 1. The inverter 4 is essential for shaping at the carry output 6 a carry signal from a given bit. The MOSFET 11, OR-NOT circuit 13 and the inverter 14 form a circuit for the carry signal transmission from the carry input 8 to the carry output 6 of the carry-forming unit 1.

Figure 2:
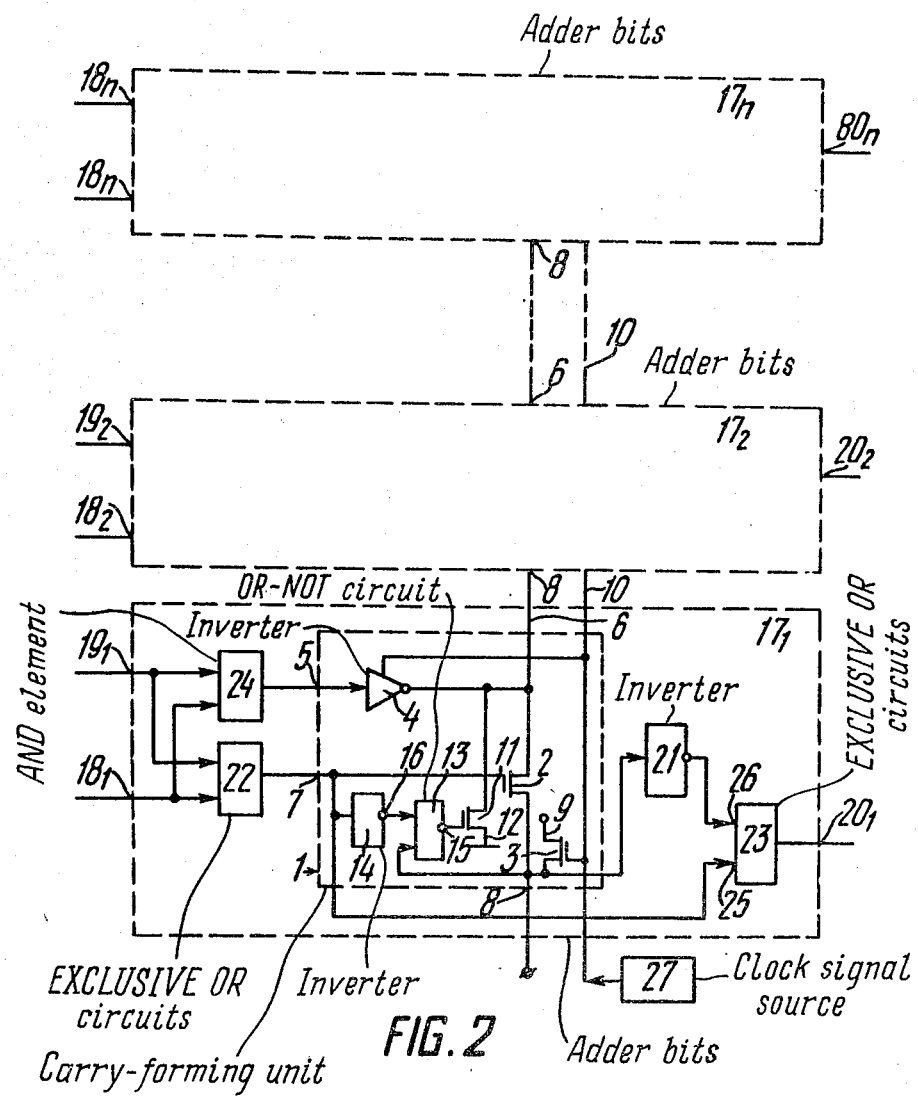
FIG. 2 is a functional block diagram of a multibit adder employing the carry-forming unit according to the present invention.

Shown in FIG. 2 is a functional block diagram of a multibit adder employing the carry-forming unit 1. Each bit $17_1$, $17_2$ ..., $17_n$, where n is the number of bits of the multibit adder employing the carry-forming unit 1, has a respective first operand input $18_1$, $18_2$ ..., $18_n$, second operand input $19_1$, $19_2$ ..., $19_n$ and an add output $20_1$, $20_2$ ..., $20_n$. Each bit $17_1$, $17_2$ ..., $17_n$ includes a carry-forming unit 1, and inverter 21, EXCLUSIVE OR elements 22, 23 and an AND element 24.

The EXCLUSIVE OR elements 22, 23 perform the function in accordance with the formula $c = a\bar{b}$ $\bar{a}b$ where a and b—input signals and c—output signal. In so doing, the operand inputs 18, 19 of each bit $17_1$, $17_2$ ..., $17_n$ are connected with first and second inputs of the AND element 24 and of the EXCLUSIVE OR element 22. The output of the AND element 24 is connected to the input 5 of first preparatory function of the carry-forming unit 1. The output of the EXCLUSIVE OR element 22 is connected to the input 7 of second preparatory function of the carry-forming unit 1 and to a first input 25 of the EXCLUSIVE OR element 23. The input of the inverter 21 is connected to the carry input 8 of the carry-forming unit 1. The output of the inverter 21 is connected to a second input 26 of the EXCLUSIVE OR element 23 whose output is connected to the add output $20_1$, $20_2$ ..., $20_n$ in each bit $17_1$, $17_2$ ..., $17_n$ of the adder. The carry inputs 8 of the carry-forming units 1 of all the bits $17_2$ ... $17_n$, with the exception of the first bit, are connected to the carry outputs 6 of the carry-forming units 1 of the preceding bit $17_1$, $17_2$ ..., $17_n$ of the multi-bit adder. The carry input 8 of the carry-forming unit 1 of the first bit $17_1$ is the carry input of the multi-bit adder. The clock signal line 10 is connected to the output of a clock signal source 27.

The herein disclosed carry-forming unit 1 (FIG. 1) operates in the following manner.

Upon the supply of a single signal to the clock signal line 10, the carry-forming unit 1 gets reset, with the MOSFET 3 turned on and generating a high potential at the carry input 8 of the carry-forming unit 1. The high potential from the carry input 8 is transmitted to the first input of the OR-NOT circuit 13 at whose output there is formed a zero potential turning off the MOSFET 11. Meanwhile, to the inputs 5, 7 of the first and second preparatory functions there are applied values equal to 0 or 1. Then, a logical zero signal is supplied to the clock signal line 10, which turns off the MOSFET 3 and clears the carry formation. In so doing, if the first preparatory function is equal to 1, the signal at the carry output 6 is shaped with the aid of the inverter 4. If the first preparatory function is equal to 0 and the second one—to 1, the carry signal propagates over two circuits, namely, via the MOSFET 2 and via the OR-NOT circuit 13 and MOSFET 11. The resulting speed gain is attained owing to the fact that the MOSFET 11 is an additional circuit of recharging a "stray" capacitance concentrated at the carry output 6 of the carry-forming unit 1. In case both the first and second preparatory functions are equal to 0, the carry-forming unit 1 stays reset. The multi-bit adder employing the carry-forming unit 1 (FIG. 2) operates in the following manner.

Supplied to the inputs $18_1$, $18_2$ ..., $18_n$, $19_1$, $19_2$ ..., $19_n$ of the bits $17_1$, $17_2$ ..., $17_n$ of the multi-bit adder are operands $\{a_i\}$, $\{b_i\}$, where $i = 1, 2 ..., n$. The logical "1" potential is supplied to the clock signal line 10 from the output of the clock signal source 27, with the "1" initial state being formed at the carry inputs of the carry-forming units 1 of each bit $17_1$, $17_2$ ..., $17_n$ of the multi-bit adder. Formed at the output of the EXCLUSIVE OR element 22 is a modulo 2 sum of the bits $\{a_i \oplus b_i\}$ which is supplied to the input 7 of the secondary preparatory function of the carry-forming unit 1. Formed at the output of the AND element 24 is a product of bits of operands $\{a_i \cdot b_i\}$, $i = 1, 2 ..., n$ which is supplied to the input 5 of the first preparatory function of the carry-forming unit 1. Then, the clock signal source 27 shapes a logical O at the clock signal line 10 and the carry signal starts to propagate via the carry-forming units 1 of each one of the bits $17_1$, $17_2$ ..., $17_n$ of the multi-bit adder. In so doing, the signal at the carry input 8 of the carry-forming unit 1 of the first bit $17_1$ does not vary since the potential to which the "stray" capacitance is charged is maintained thereon throughout the add time. In case it is required that the carry to the first bit $17_1$ be other than zero, an active signal source (not shown in the drawings) should be connected to the carry input 8 of the adder.

The second EXCLUSIVE OR element 23 and the inverter 21 serve for forming a sum in each one of the bits $17_1$, $17_2$ ..., $17_n$ $$\{S_i\} = \{a_i \oplus b_i \oplus c_i\}$$

$S_i$—sum bit where $i = 1, 2 ..., n$.

The most unfavourable case for the carry propagation is the addition of operands the code of one of which has ones in all of the bits except the last one while the code of the other operand has zeros in all of the bits except the first one. In this case, the carry propagates via transistors 2 of the carry-forming units of all of the bits $17_1$, $17_2$ ..., $17_n$, which form a distributed R-C circuit. However, when the carry signal reaches the level of operation threshold of the OR-NOT circuit 13, the MOSFET 11 is turned on, which is an additional active element in the circuit. Thus, the carry signal propagates through the turned-on MOSFET's 2 of the carry-forming units 1 but no signal attenuation is observed because the MOSFET's 11 of the carry-forming units 1 are turned on with some delay. Thereby, the short time of the carry passage through the turned-on MOSFET 2 is combined with the absence of attenuation of the carry signal in its propagation circuit.

In this manner, the present invention helps increase the speed of multi-bit adders, and priority and comparator circuits.

We claim:
1. A carry-forming unit comprising:
a carry input, a carry output, an input of a first preparatory function, an input of a second preparatory function of said carry-forming unit;
a first metal oxide semiconductor field effect transistor (MOSFET) transmitting a signal from said carry input to said carry output of said carry-forming unit; a drain electrode of said first MOSFET connected to said carry output of said carry-form- ing unit; a gate electrode of said first MOSFET connected to said input of second preparatory function of said carry-forming unit; a source electrode of said first MOSFET connected to said carry input of said carry-forming unit;

a second MOSFET for resetting said carry-forming unit; a drain electrode and a gate electrode of said second MOSFET; a source electrode of said second MOSFET connected to said carry input of said carry-forming unit;

a first inverter for shaping a carry signal at said carry output of said carry-forming unit; an input of said first inverter connected to said input of a first preparatory function of said carry-forming unit; an output of said first inverter connected to said carry output of said carry-forming unit; and a pulse signal-receiving input of said first inverter;

a power supply line connected to said drain electrode of said second MOSFET;

a clock signal connected to said pulse signal-receiving input of said first inverter and to said gate electrode of said second MOSFET;

a common reference potential bus;

a third MOSFET; a source elecrode of said third MOSFET connected to said common bus; a drain electrode of said third MOSFET connected to said drain electrode of said first MOSFET; a gate electrode of said third MOSFET;

an OR-NOT circuit; a first input of said OR-NOT circuit connected to said carry input; a second input of said OR-NOT circuit; an output of said OR-NOT circuit connected to said gate electrode of said third MOSFET;

a second inverter forming with said third MOSFET and said OR-NOT circuit a circuit for the transmission of said carry signal from said carry input to said carry output of said carry-forming unit; an input of said second inverter connected to said input of the second preparatory function; an output of said second inverter connected to said second input of said OR-NOT circuit.

* * * * *